(12) United States Patent
Bauer et al.

(10) Patent No.: US 8,170,773 B2
(45) Date of Patent: May 1, 2012

(54) METHOD FOR THE DIRECT RE-ENTRY IN THE CAI OPERATING MODE OF AN INTERNAL COMBUSTION ENGINE FOLLOWING A PULL FUEL CUT OFF PHASE AS WELL AS A PERTINENT CONTROL UNIT

(75) Inventors: Erwin Bauer, Lappersdorf (DE);
Dietmar Ellmer, Regensberg (DE)

(73) Assignee: Continental Automotive GmbH, Hannover (DE)

( * ) Notice: Subject to any disclaimer, the term of this patent is extended or adjusted under 35 U.S.C. 154(b) by 563 days.

(21) Appl. No.: 12/275,331

(22) Filed: Nov. 21, 2008

(65) Prior Publication Data

US 2009/0138180 A1    May 28, 2009

(30) Foreign Application Priority Data

Nov. 28, 2007  (DE) .......................... 10 2007 057 290

(51) Int. Cl.
*F02B 3/00* (2006.01)
(52) U.S. Cl. ........ 701/104; 701/105; 123/299; 123/295; 123/297; 123/300; 123/304; 123/568.14; 123/568.13
(58) Field of Classification Search ................ 123/27 R, 123/27 GE, 295, 297, 299, 300, 604, 605, 123/406.24, 406.26, 406.35, 406.45, 406.47, 123/406.48, 406.53, 406.55, 431, 698, 700, 123/445, 448, 453, 568.11, 568.13, 568.14, 123/568.21, 179.9, 179.12, 179.16, 179.18, 123/198 F, 198 DB, 198 DC; 701/104, 105, 701/113
See application file for complete search history.

(56) References Cited

U.S. PATENT DOCUMENTS

| | | | | |
|---|---|---|---|---|
| 6,386,177 | B2 * | 5/2002 | Urushihara et al. | 123/299 |
| 6,516,774 | B2 * | 2/2003 | zur Loye et al. | 123/299 |
| 6,561,157 | B2 * | 5/2003 | zur Loye et al. | 123/295 |
| 7,121,233 | B2 * | 10/2006 | Kitamura et al. | 123/27 R |
| 7,194,996 | B2 * | 3/2007 | Koopmans | 123/295 |
| 7,400,966 | B2 * | 7/2008 | Strom et al. | 701/104 |
| 7,533,650 | B2 * | 5/2009 | Kim | 123/300 |
| 7,810,463 | B2 * | 10/2010 | Otterspeer et al. | 123/179.1 |
| 2002/0053336 | A1 * | 5/2002 | Nogi et al. | 123/299 |
| 2010/0242901 | A1 * | 9/2010 | Seto et al. | 123/299 |

OTHER PUBLICATIONS

Basshuysen, Wiesbaden: Vieweg, pp. 95-97, Book, DE., Apr. 2007.

* cited by examiner

*Primary Examiner* — Stephen K Cronin
*Assistant Examiner* — Raza Najmuddin
(74) *Attorney, Agent, or Firm* — King & Spalding L.L.P.

(57) ABSTRACT

For the direct re-entry in the CAI operating mode following a pull fuel cut off phase the CAI specific valve lift is maintained during its pull fuel cut off phase. Upon a request signal for the CAI re-entry after the closing time of the particular cylinder, an advance fuel injection quantity is injected in the combustion chamber and externally ignited and combusted in the following CAI interim compression phase of the exhaust stroke, as a result of which hot exhaust gas is formed in the combustion chamber, fresh air is drawn into the combustion chamber during the following intake stroke, a main fuel injection quantity is injected in a main compression phase during the following compression stroke, and the exhaust gas content brought about from the earlier auxiliary fuel injection, is mixed with the air-fuel mixture newly introduced for the main ignition to form a self-ignitable, homogenous fresh air-exhaust gas-fuel mixture.

16 Claims, 3 Drawing Sheets

METHOD FOR THE DIRECT RE-ENTRY IN THE CAI OPERATING MODE OF AN INTERNAL COMBUSTION ENGINE FOLLOWING A PULL FUEL CUT OFF PHASE AS WELL AS A PERTINENT CONTROL UNIT

CROSS-REFERENCE TO RELATED APPLICATIONS

This application claims priority to German Patent Application No. 10 2007 057 290.7 filed Nov. 28, 2007, the contents of which is incorporated herein by reference in its entirety.

TECHNICAL FIELD

The invention relates to a method for direct re-entry in the Controlled Auto Ignition operating mode (MCAI) of an internal combustion engine.

BACKGROUND

The so-called CAI ("Controlled Auto Ignition") combustion process as Otto cycle operating mode of an internal combustion engine is merely possible in a limited operating range. For on the one hand the engine rotational speed range is limited upwards for the CAI combustion operation in that with engine rotational speeds which are too high pressure gradients which are too high and can damage the internal combustion engine can occur in the combustion chambers of said cylinder during the respective combustion process. On the other hand the high residual gas rates demanded for the CAI combustion operation in the combustion chambers of the cylinders of the internal combustion engine limit the cylinder charges with fresh air of said combustion engine and thus the engine rotational moment that can be achieved. The danger of delayed combustion or a combustion misfire in the respective cylinder due to low charge temperature and retarded combustion start in CAI combustion operation resulting from this furthermore limits its rotational speed operating range towards the bottom, so that as a rule no idle speed can be realized in the CAI combustion mode. If the prerequisites in terms of engine rotational speed, engine rotational moment, residual gas rate of combusted air/fuel mixture in the combustion chamber of the respective cylinder or other CAI typical parameter for the CAI operating mode of the Otto cycle combustion engine is not satisfied, said combustion engine in practice is externally ignited in the so-called SI ("Spark Ignition") operating mode. In order to be able to bring the respective combustion engine in the CAI operating mode at all, starting from the SI combustion operation residual gas of combusted air/fuel mixture is retained in the combustion chamber of the respective cylinder during its exhaust cycle in that a changeover is performed more preferably through camshaft lift changeover to a smaller valve lift of the respective exhaust valve of this cylinder.

If the internal combustion engine is in the CAI operating mode and a pull fuel cut off is performed, i.e. the injection of fuel is switched off over the period of time of at least one combustion cycle, exclusively fresh air is pumped through the internal combustion engine. This means that hot residual gas, which is a prerequisite for initiating the CAI combustion is retained in the combustion chamber of the respective cylinder which happens to be in the exhaust stroke through camshaft lift changeover in conjunction with a—for example two-stage—valve lift changeover, is missing. Consequently reemployment in the fired combustion operation of the CAI combustion mode could not take place directly in the CAI mode but the detour via the externally ignited SI operating mode would be necessary. Such a change or such a changeover from CAI operating mode to the SI operating mode after a pull fuel cut off phase would be control-technically expensive, would pose change over risks and be inefficient. More preferably valuable CAI potential, i.e. the high combustion efficiency and low NOx emissions at the same time in accompanying the CAI operating mode would be lost.

SUMMARY

According to various embodiments, a way as to how with an Otto cycle internal combustion engine a direct resumption of the CAI operating mode following a pull fuel cut off phase is made possible without changing in the SI operating mode.

According to one embodiment, a method for direct re-entry in the Controlled Auto Ignition (CAI) operating mode of an internal combustion engine following a pull fuel cut off phase in which the CAI specific valve lift for the gas exhaust valves of the cylinders of the internal combustion engine during the pull fuel cut off phase of said engine is maintained, may comprise the steps of: upon a request signal for re-entry in the CAI operating mode after the closing time of the one or several gas exhaust valves of the particular cylinder which happens to be at the end of the respective pull fuel cut off phase in the exhaust stroke of its combustion cycle, injecting in a combustion chamber of the particular cylinder an advance fuel injection quantity as auxiliary fuel injection to create an ignitable air-fuel mixture; externally igniting through an ignition device the air-fuel mixture created in advance which is combusted in the following CAI interim compression phase of the exhaust stroke of that cylinder, as a result of which hot exhaust gas is formed in the combustion chamber of that cylinder; in the following intake stroke of that cylinder, drawing fresh air into the combustion chamber of that cylinder via the one or several gas inlet valves; injecting in the following compression stroke of that cylinder a main fuel injection quantity in the combustion chamber of that cylinder in a main compression phase; and mixing the exhaust gas content of that cylinder brought about from the earlier auxiliary fuel injection with the air-fuel mixture newly introduced for the main injection to form a CAI self ignitable homogenous fresh air-exhaust gas-fuel mixture.

According to a further embodiment, the advance fuel injection quantity for the auxiliary fuel injection in the interim compression phase of the respective cylinder, which happens to be at the end of the pull fuel cut off phase in the exhaust stroke of its combustion cycle, may be apportioned into the combustion chamber of that cylinder in such a manner that upon re-entry in the CAI operating mode of the internal combustion engine after the main injection together with the main fuel injection quantity introduced in the process a substantially steady rotational moment course is brought about. According to a further embodiment, following the respective pull fuel cut off phase as CAI specific valve lift for at least one of the exhaust and inlet gas breathing valves of the cylinders a smaller valve lift than in the SI-operating mode of the internal combustion engine may be selected. According to a further embodiment, even during the pull fuel cut off phase on at least one of the inlet and exhaust side a CAI specific smaller valve lift for the gas breathing valves than in the SI-operating mode of the internal combustion engine may be maintained. According to a further embodiment, the changeover to the externally ignited SI-operating mode of the internal combustion engine can be performed as soon as the rotational speed of the internal combustion engine falls below a predetermined threshold below which a CAI operating mode becomes impossible. According to a further embodiment, the auxiliary injection of an advance fuel injection quantity in the interim compression of the particular cylinder which happens to be at the end of the pull fuel cut off phase in the exhaust stroke of its combustion cycle may be only initiated if the target engine operating point of the internal combustion engine after the resumption of the combustion operation permits the CAI operating mode. According to a further embodiment, during the pull fuel cut off phase the throttle valve in the air intake stroke of the internal combustion engine may be opened as far as possible. According to a further embodiment, the request signal for re-entry in the CAI operating mode following a pull fuel cut off phase can be created through a rotational moment request of a driver or through the engine control unit ECU of the internal combustion engine.

According to another embodiment, a control unit with a control process logic for the direct re-entry in the CAI operating mode of an internal combustion engine following a pull fuel cut off phase, may be operable to control/perform the above mentioned method.

BRIEF DESCRIPTION OF THE DRAWINGS

The invention and its further developments are explained in more detail in the following by means of drawings. It shows.

Elements with the same function and mode of operation are provided with the same reference symbols in the FIGS. 1 and 3.

DETAILED DESCRIPTION

Figure 1:
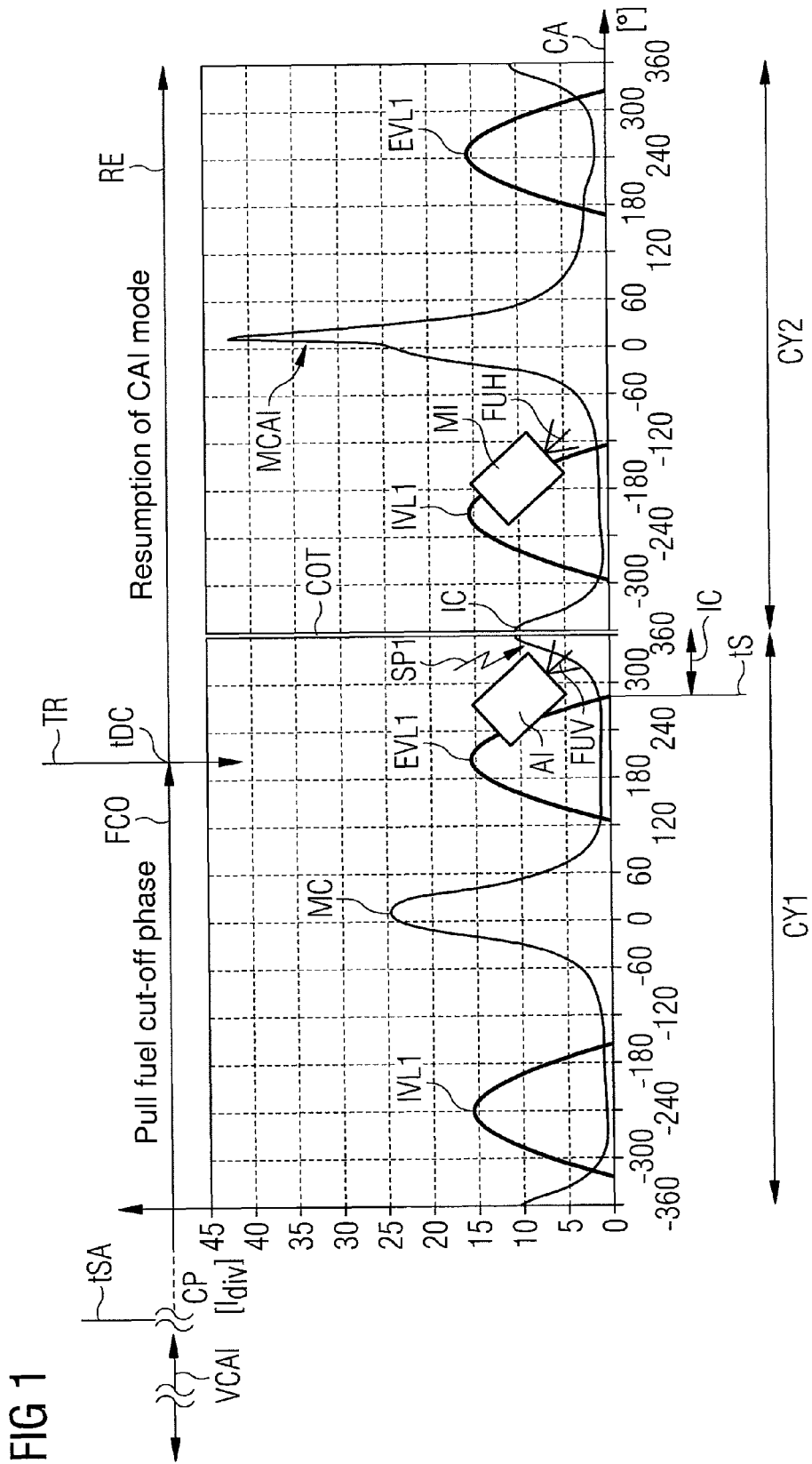
FIG. 1 by means of a schematic internal cylinder pressure diagram an advantageous fuel injection strategy for the respective cylinder of an Otto-fuel internal combustion engine for the direct resumption in the CAI operating mode of the internal combustion engine following a pull fuel cut off phase according to various embodiments, FIG. 2 a schematic sequence diagram in a control unit for the direct re-entry in the CAI operating mode of the Otto-fuel internal combustion engine according to the injection strategy of FIG. 1, and FIG. 3 in schematic general representation an internal combustion engine according to the Otto-principle with a control unit, which makes possible a direct re-entry in the CAI operating mode according to the control strategy according to the FIGS. 1 and 2.

According to an embodiment, in a method for the direct re-entry in the CAI operating mode of an internal combustion engine following a pull fuel cut off phase, the CAI specific valve lift for the gas exhaust valves of the cylinders of the internal combustion engine during the pull fuel cut off phase of said internal combustion engine is maintained in that upon a request signal for re-entry in the CAI operating mode following the closing point of time of the one or several gas outlet valves of the cylinder which finds itself at the end of the respective pull fuel cut off phase in the exhaust stroke of its combustion cycle, an initial fuel injection quantity as fuel auxiliary injection for generating an ignitable air-fuel mixture is injected in said cylinder, the air-fuel mixture generated in advance is externally ignited and combusted in the following CAI intermediate compression phase of the exhaust stroke of that cylinder through an ignition device, as a result of which hot exhaust gas is formed in the combustion chamber of that cylinder, in the following intake stroke of this cylinder, fresh air is drawn into the combustion chamber of that cylinder via the one or several gas inlet valves, in the following compression stroke of that cylinder a main fuel injection quantity is injected in the combustion chamber of that cylinder in a main compression phase, and the exhaust content of that cylinder effected from the earlier auxiliary fuel injection is mixed with the air-fuel mixture newly introduced for the main injection into a CAI self-ignitable homogenous fresh air-exhaust gas-fuel mixture.

In this way, CAI operation can be directly resumed after a pull fuel cut off phase of the Otto cycle combustion engine which was already operated in the CAI operating mode prior to the pull fuel cut off phase. No detour, that is change into the externally ignited SI mode with corresponding valve lift changeover is required. This avoids the danger of changeover errors more preferably of the valve lift changeover device and the accompanying jerking of the internal combustion engine. Since the internal combustion engine can continuously, i.e. without interruption, remain in the CAI operating mode even after the respective pull fuel cut off phase, improved combustion efficiency as well as improved NOx emission characteristics for an internal combustion engine operated in such a manner are obtained on the whole. Since the load control of the CAI operating mode primarily occurs via fuel rate and injection phasing, throttling via the throttle valve is not required either. It can thus remain open in an advantageous manner which has a positive effect on the behavior on the road during the pull fuel cut off phase since the engine breaking moment is very low and a vehicle with such a controlled internal combustion engine without fuel requirement continues to run or rolls to a halt for a correspondingly long time with only a minor drop in rotational speed.

According to another embodiment, a control unit with a control process logic for the direct re-entry in the CAI operating mode of an internal combustion engine following a pull fuel cut off phase may control perform the above mentioned method.

Figure 3:
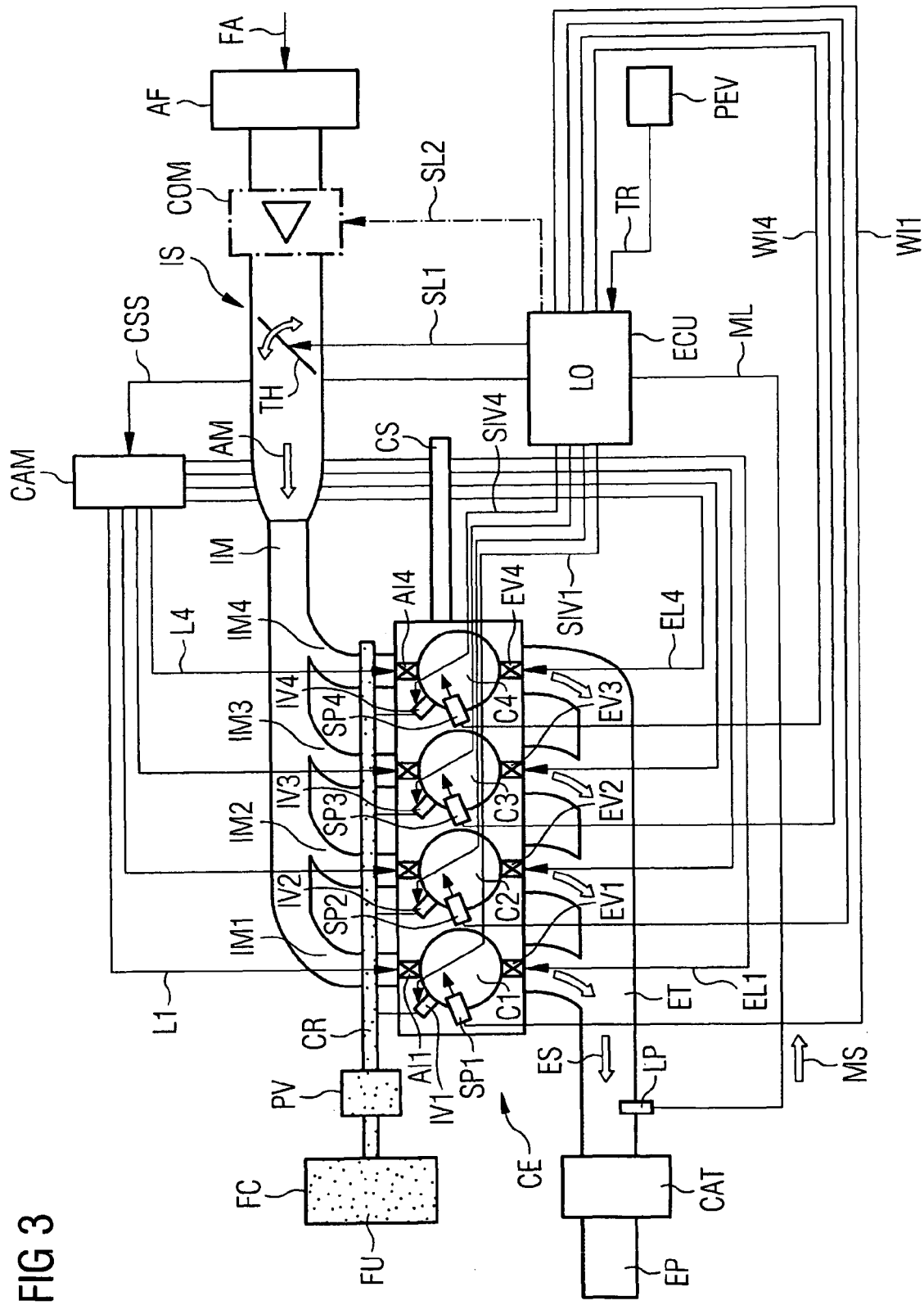

FIG. 3 is a schematic representation of main components of an Otto cycle internal combustion engine CE. This internal combustion engine CE in the exemplary embodiment here comprises four cylinders C1 to C4. In the combustion mode of the Otto engine CE, fresh air FA is drawn into the air intake tract IS of the Otto engine CE via an air filter AF. By means of a throttling device TH the air mass AM can be regulated, which is supplied to a suction pipe IM of the air intake tract IS on the engine block inlet side. The suction pipe IM apportions the inflowing air mass flow AM to the cylinders C1 to C4 via cylinder-specific distribution pipes IM1 to IM4. The opening cross section which is opened by the throttling device TH in the entry section of the air intake tract IS for the drawn-in fresh airflow FA is controlled in the process from a motor control unit ECU. This is indicated by a control arrow SL1 in FIG. 3. If required, a compressor device can be additionally provided in front of the throttling device TH viewed in the air inflow direction, with which air compression of the inflowing air mass flow FA is carried out. A compressor device COM is indicated dash-dotted in FIG. 3. The degree of compression of the compressor or compression device COM in the process is likewise controlled or regulated from a control unit ECU, which is indicated by a dash-dotted action arrow SL2.

Each cylinder C1 to C4 comprises at least one gas inlet valve AI1 to AI4 on the inlet side. These gas inlet valves can be opened and closed cylinder-individually via an actuator device CAM with the help of the engine control unit ECU, which is indicated through specifically assigned actuation arrows L1 to L4 in FIG. 3. The actuator device CAM preferentially may comprise cams on the camshaft of the internal combustion engine CE, through which the valve tappets of the gas inlet valves AI1 to AI4 are actuated. In like manner the gas exhaust valves EV1 to EV4 of the cylinders C1 to C4 are opened and closed through the actuator device CAM. The actuation of the gas exhaust valves EV1 to EV4 of the cylinders C1 to C4 in each case is indicated by an actuation arrow EL1 to EL4.

For apportioning fuel FU into the combustion chambers of the cylinders C1 to C4, each of these is assigned one or several injectors or injection valves EV1 to EV4. The injection valves EV1 to EV4 are controlled from the engine control unit ECU in such a manner that a defined fuel quantity to be apportioned in each case enters the combustion chamber of the respective cylinder C1 to C4 for initiating a desired combustion process. The cylinder-specific control of the individual injectors IV1 to IV4 with the help of the engine control unit ECU is symbolized in FIG. 3 through actuation arrows SIV1 to SIV 4. The injectors IV1 to IV4 in the present exemplary embodiment are connected to a common fuel line into which the fuel FU is pumped under high pressure by means of a high pressure pump PV. The fuel FU is hereby taken from a fuel tank or reservoir FC by the high-pressure pump PV. Each cylinder C1 to C4 is assigned an ignition device SP1 to SP4 which serves to externally ignite the air/fuel mixture introduced in the combustion chamber of the respective cylinder C1 to C4 in the so-called SI operating mode of the internal combustion engine CE. The ignition devices SP1 to SP4 are likewise actuated, i.e. activated, by the engine control unit ECU. This individual control of the ignition devices SP1 to SP4 is marked in FIG. 3 through actuation arrows WI1 to WI4. With the present 4-cylinder internal combustion engine CE each cylinder C1 to C4 in the externally ignited SI operating mode passes through the cyclical sequence

- of an intake stroke, while the respective gas inlet valve of the each cylinder is opened for a predeterminable period of time for drawing in fresh air,
- a downstream compression stroke, during which its respective gas inlet valve as well as gas exhaust valve are closed, a main fuel quantity is injected in the combustion chamber through the injector and finally the main air/fuel mixture being formed is ignited through the ignition device,
- a downstream working stroke during which the actual combustion of the introduced main air/fuel mixture takes place, and
- a downstream exhaust stroke during which the respective gas exhaust valve is opened for a certain period of time.

During the respective working stroke a rotary moment is applied in each case by means of the piston of the respective cylinder to the crankshaft CS of the internal combustion engine CE so that the latter is rotated. Each stroke of the combustion cycle of the respective cylinder is assigned a crank-shaft angle CA of approximately 180 degrees [°] each. The combusted exhaust gases ES expelled by the individual cylinders C1 to C4 during their respective exhaust stroke reach a common exhaust tract ET via exhaust manifolds of the cylinders C1 to C4. By means of a λ (Lambda) probe LP the ratio of air quantity, more preferably residual oxygen quantity and not completely combusted fuel quantity in the exhaust flow ES is determined and a measuring signal MS representative of this is transmitted to the engine control unit ECU via a measuring line ML. Via various control quantities such as for example the opening angle of the throttling device TH, apportioned main fuel quantity, etc. the engine control unit ECU controls the air fuel mixture apportioned to each combustion chamber of the respective cylinder in such a manner that λ=1 may be preferably obtained, i.e. for charging the combustion chamber of the respective cylinder the stoichiometric ratio between introduced air quantity and fuel is set in such a manner that the apportioned fuel may be preferably combusted completely. The exhaust gas ES is finally conducted via a catalytic converter CAT to the exhaust gas-cleaning device and emitted in a cleaned state by the exhaust EP of the exhaust tract ET.

In addition to the SI ("spark ignition") combustion operation the Otto cycle internal combustion engine CE can now be also operated in the so-called CAI ("controlled auto ignition") combustion operating mode. The CAI operating mode is characterized through self ignition of an air/fuel mixture introduced in the combustion chamber of the respective cylinder. Prerequisite for this among other things is an adequately large residual gas quantity of combusted air/fuel mixture which following the respective exhaust stroke of the combustion cycle remains in the combustion chamber of the respective cylinder and in the next compression stroke during the fuel main injection serves for the initiation of a self ignition in the compression stroke of the total air/fuel quantity introduced in the chamber of the respective cylinder. This retention of hot residual gas is achieved in that on the one hand a smaller valve lift than previously in the SI operating mode is adjusted for the gas inlet valves AI1 to AI4 with the help of the actuator device CAM. To this end the actuator device CAM may comprise more preferably a so-called camshaft lift change-over device. In a manner analog to this the actuator device CAM on the other hand may more preferably initiate the change of the gas outlet valves EV1 to EV4 to a smaller valve lift (compared with the larger valve lift during the SI mode). This causes a hot residual gas quantity to be retained in the combustion chamber of the respective cylinder following its respective exhaust stroke, a part of this is held in the combustion chamber of that cylinder during the following air intake stroke and during the downstream compression stroke utilized for the self ignition of the newly introduced air/fuel mixture. The actuator device CAM may more preferably comprise a two-stage camshaft lift changeover device which during the CAI operating mode assigns the exhaust valves and the gas inlet valves a smaller valve lift than in the SI operating mode. The change from the larger valve lift to the smaller valve lift during the transition from the SI operation to the CAI operation may be preferentially initiated with the help of a control signal CSS by the engine control unit ECU to the actuator device CAM. Conversely, changing back from CAI operation to SI operation is possible through a corresponding control signal in that the engine control unit ECU instructs the actuator device CAM to change from the smaller valve lift for the gas exhaust valves and the gas inlet valves during CAI operation to the larger valve lift for SI operation.

If the internal combustion engine now happens to be already in the CAI operating mode and a pull fuel cut off for the internal combustion engine CE is performed by the engine control unit ECU during the CAI operation upon a request signal TR, i.e. the injection of fuel FU is switched off over the period of time of at least one combustion cycle or preferentially more than one combustion cycle, exclusively fresh air is pumped through all cylinders C1 to C4 of the internal combustion engine CE.

This means that hot residual gas, which is a prerequisite for initiating the CAI combustion, is absent in the combustion chamber of the specific cylinder which happens to be in the exhaust stroke and for which the next combustion process is planned. Thus, recommencement of the fired combustion operation of the CAI combustion mode would not be immediately possible but a detour via the externally ignited SI operating mode would be necessary. Such a change or such a changeover from the CAI operating mode to the SI operating mode following a pull fuel cut off phase however would be expensive in terms of control technology, imbued with control errors and inefficient. More preferably advantages of the CAI operating mode such as high combustion efficiency and low NOx emissions at the same time would be lost.

In order to now make possible direct resumption of the CAI operating mode for the Otto cycle internal combustion engine following a pull fuel cut off phase without having to change back into the SI operating mode the CAI specific valve lift for the gas outlet valves of the cylinders of the internal combustion engine is maintained even during its pull fuel cut off phase, upon a request signal for re-entering the CAI operating mode after the closing point of time of the one or several gas exhaust valves of the specific cylinder which happens to be at the end of the respective pull fuel cut off phase in the exhaust stroke of its combustion cycle, a fuel advance injection quantity as auxiliary fuel injection for creating an ignitable air/fuel mixture is injected in the combustion chamber of said cylinder, the air/fuel mixture created in advance is externally ignited and combusted in the following CAI intermediate compression phase of the exhaust stroke of that cylinder through an ignition device, as a result of which hot exhaust gas is formed in the combustion chamber of that cylinder, in the following intake stroke of that cylinder, fresh air is drawn in the combustion chamber of that cylinder via the one or several gas inlet valves, in the following compression stroke of that cylinder, a main fuel injection quantity is injected in the combustion chamber of that cylinder in a main compression phase, and the exhaust content of that cylinder brought about by the earlier auxiliary fuel injection is mixed with the air/fuel mixture newly introduced for the main injection to form a CAI self ignitable homogenous fresh air-exhaust gas-fuel mixture.

This strategy for the direct resumption of the CAI operating mode following a pull fuel cut off phase is explained in more detail with the help of the exemplary internal cylinder pressure diagram of FIG. 1. Along the abscissa the crankshaft angle CA is marked off in degrees [°]. The internal cylinder pressure CP in the unit of bar is assigned to the ordinates of this diagram. The continuous crankshaft angle CA here corresponds to a continuous time t (see also FIG. 2).

After the internal combustion engine CE has been brought in the CAI operating mode during the period VCAI a pull fuel cut off for the internal combustion engine CE takes place at the time tSA. This means that fuel is no longer directly injected in the combustion chambers of the cylinders C1 to C4 through the injectors IV1 to IV4. During this pull fuel cut off phase FCO for at least one stroke cycle of the respective cylinder such as for instance C1 in this case, exclusively fresh air is pumped into the combustion chamber of said cylinder via the gas inlet valve and expelled in the exhaust stroke. This means that the combustion chamber of the respective cylinder has been purged with fresh air and residual gas, which is required for initiating the CAI combustion is now absent in the combustion chamber of the respective cylinder. In FIG. 1 the internal cylinder pressure curve for the cylinders of the internal combustion engine CE which happen to be at the end of the pull fuel cut off phase FCO in the exhaust stroke of a working cycle is shown over two stroke cycles. Here, in the exemplary embodiment, this is for example the cylinder C1. During a first working cycle CY1 the intake stroke of this working cycle is performed between the crankshaft angles CA=−360° degree to −180°. Here, somewhat staggered in time, after the top dead center of the piston of this cylinder, the gas inlet valve of said cylinder is opened and slightly offset in time again closed after the bottom dead center of the piston of that cylinder. This valve elevation curve of the gas inlet valve 81 is designated IVL1 in FIG. 1. After the bottom dead center of the piston of cylinder C1 the internal pressure of that cylinder is increased in the compression stroke up to the crankshaft angle CA=0° degrees after the closing of the gas inlet valve AI1. During this compression stroke between the crankshaft angles CA=−180° degrees and 0° degrees the piston of that cylinder moves from bottom dead center to its top dead center and as a result brings about a main compression of the air located in its combustion chamber since both the gas inlet valve as well as the exhaust valve of that cylinder are closed. During the pull fuel cut off phase FCO no combustion takes place here since only air is present in the combustion chamber of that cylinder or a residual gas rate which is too low for the CAI combustion process. In the following working stroke between the crankshaft angles CA=0° degrees and 180° degrees the piston of that cylinder moves from its top dead center to its bottom dead center and in the process expands the air quantity enclosed therein. Finally before the bottom dead center at CA=180° degrees the gas exhaust valve of that cylinder is opened and in the following exhaust stroke (crank-shaft angle range CA=180°-360° degrees) after the crank-shaft angle CA=180° degrees the air is pressed out of that cylinder. During the pull fuel cut off phase the CAI specific smaller valve lift is maintained for the gas exhaust valve and the gas inlet valve of that cylinder. As a result, the gas exhaust valve of that cylinder closes before the piston of that cylinder reaches its top dead center at CA=360° degrees. As a result, an intermediate compression in the exhaust stroke which is typical for the CAI operating mode, occurs.

If now at the time tDC by means of a request signal TR of the control unit ECU of the internal combustion engine CE re-entry in the CAI combustion mode MCAI is requested, a fuel advance injection quantity FUV as auxiliary fuel injection AI is injected after the closing time tS of the one or several gas exhaust valves of the specific cylinder such as in this case C1, which happens to be at the end of the of the respective pull fuel cut off phase FCO in the exhaust stroke of its combustion cycle to generate an ignitable auxiliary air/fuel mixture and in the following CAI intermediate compression phase IC of the exhaust stroke of that cylinder externally ignited and combusted through an ignition device such as for instance SP1 in this case. This auxiliary injection in the intermediate compression phase IC during the time span between the closing time tS of the one or several gas exhaust valves EV1 of the cylinder C1 and the end of its exhaust stroke at CA=360° degrees brings about an externally ignitable auxiliary air/fuel mixture through the external ignition of which a hot exhaust gas is provided in the combustion chamber of that cylinder C1.

After the top dead center COT of the piston in the combustion chamber of that cylinder at the end of the intermediate compression phase IC there follows the next intake stroke between the crankshaft angles CA=−360° degrees and −180° degrees of the next working cycle CY2. Here, the gas inlet valve AI1 of that cylinder C1 is opened offset in time to the top dead center COT to draw in fresh air. The inlet valve elevation curve of the gas inlet valve in turn is designated IVL1. It corresponds to the CAI—smaller valve lift. During the following compression stroke between the crankshaft angles CA=−180° degrees and 0° degrees the main injection MI of a main fuel injection quantity FUH in the combustion chamber of that cylinder C1 takes place by means of the injector IV1. In other words, a main fuel quantity FUH is injected in the combustion chamber of the cylinder C1 through the injector IV1 in the main compression phase as in the regular CAI combustion mode. In the process, the exhaust gas content in the combustion chamber of that cylinder brought about from the earlier auxiliary fuel injection is mixed with the air/fuel mixture newly introduced for the main injection to form a CAI self ignitable homogenous fresh air/exhaust gas fuel mixture. Thus, a self-ignition of the total air/fuel mixture present in the combustion chamber of that cylinder occurs at the end of the main compression phase so that CAI operation can be resumed. Resumption of the CAI operation is designated with a time halfline RE in FIG. 1.

Preferentially the advance fuel injection quantity FUV for the auxiliary fuel injection in the intermediate compression phase IC of the respective cylinder, such as for instance CI in this case, which happens to be at the end of the pull fuel cut off phase FCO in the exhaust stroke of its combustion cycle may be apportioned into the combustion chamber of that cylinder C1 in such a manner that upon the re-entry in the CAI operating mode MCAI of the internal combustion engine CE following the main injection together with the main fuel injection quantity FUH introduced in the process a substantially steady rotating moment curve is brought about. This largely avoids undesirable jerking of the crankshaft of the engine.

If applicable it can already suffice if following the respective pull fuel cut off phase FCO a smaller CAI specific valve lift is maintained merely for the gas exhaust valves of the cylinders, but the larger valve lift is selected for the gas inlet valves. Alternatively to this it can also suffice to merely assign a smaller valve lift to the gas inlet valves of the cylinders for the CAI operation while the larger valve lift is adjusted for the gas exhaust valves.

Considered in summary a smaller valve lift than in the SI operating mode of the internal combustion engine CE is selected in an advantageous manner following the respective pull fuel cut off phase FCO as CAI specific valve lift for the exhaust and/or inlet gas breathing valves.

Figure 2:
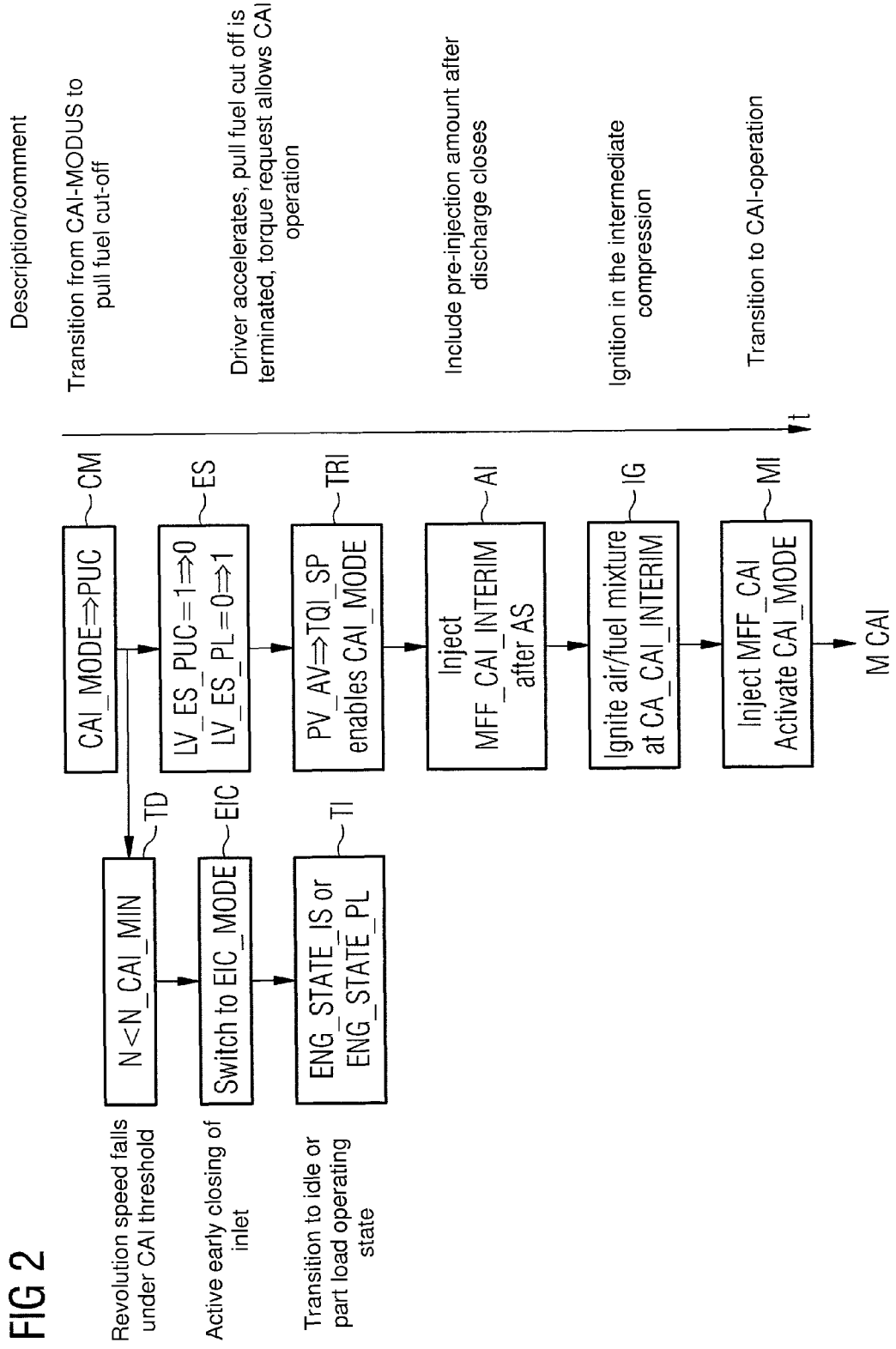

FIG. 2 illustrates by means of a flow diagram an advantageous strategy for the direct resumption of the CAI mode following a pull fuel cut off phase as is performed in the control process logic LO (see FIG. 3) of the engine control unit ECU of FIG. 3 in an advantageous manner. In the step CM the control process logic LO determines a transition or change from the CAI operating mode CAI_MOD into a pull fuel cut off phase PUC ("Pull Fuel Cut Off"="switch off fuel supply"). After this, it checks in the step TD if the rotational speed N of the crankshaft CS drops below a threshold or a lower limit N_CAI_MIN below which the CAI operating range is departed from and is no longer possible.

If this CAI threshold for the rotational speed N is undershot the control process logic LO activates the SI mode ("Spark Ignited"). If applicable, early inlet closing of the gas inlet valve is triggered in the step EIC. Because of this, the throttling device TH can be largely left open for low rotational speeds so that throttling losses are largely avoided. The change for early inlet closing in the step EIC is designated "Switch to EIC_MOD", which is an acronym for "Switch to Early Inlet Closing Mode"). After this, the control process logic LO activates a transition to idling or part load operation in the step TI. In other words, it transfers the engine operating state into the idle engine state ENG_STATE_IS or in the part load operating state ENG_STATE_PL.

During the transition from the CAI mode in the pull fuel cut off phase the control process logic LO in the step ES assigns the logical variable LV_ES_PUC for the pull fuel cut off with a logical 0 instead of a 1. As a countermove it sets the logical variable LV_PS_PL from a logical 0 to a logical 1 to identify idling or part load operation.

If a driver of the motor vehicle with the internal combustion engine CE at a later date in the pull fuel cut off phase should now demand a certain engine rotational moment by pressing the accelerator, more preferably by actuating the accelerator pedal PEV (see FIG. 3), it is signaled to the engine control unit ECU by means of the control signal TR that re-entry in the CAI operating mode which was present prior to the pull fuel cut off phase is requested. In FIG. 2 in the step TRI the current pedal value is converted into a rotational moment request value corresponding to that and it is checked if the current rotational moment request allows a CAI operating mode. If this is the case, an advance fuel injection quantity FUV is injected in the intermediate compression of that cylinder which happens to be at the end of the pull fuel cut off phase in the exhaust stroke of its combustion cycle after the closing time of the gas exhaust valve of said cylinder with the help of its injector. In FIG. 2, this is identified by the step AI. There it says "Inject MFF_CAI_INTERIM after AS" in acronym language, which means that an advance fuel injection quantity MFF ("mass fuel flow") in an auxiliary injection is performed after the outlet (AS). During the "CAI_IN-TERIM" (CAI intermediate compression). After this, in the intermediate compression in the step IG, this advance injection quantity FUV, which has thoroughly mixed with the air present in the combustion chamber, is externally ignited through an ignition device. In FIG. 2 this is identified in step IG by the acronym "Ignite air/fuel mixture at "CA_CAI_IN-TERIM". This means that just before top dead center of the interim compression external ignition of the advance air-fuel injection quantity mixture in the combustion chamber of that cylinder is brought about. As a consequence, residual gas of combusted air/fuel mixture remains in the combustion chamber of that cylinder after the exhaust stroke and regular CAI operating mode can be resumed. To this end, in the following compression stroke, merely a main injection quantity ("Inject MFF_CAI" in the step MI) of fuel is injected in the combustion chamber of that cylinder through at least one injector. In other words, the exhaust gas content of that cylinder brought about from the earlier auxiliary fuel injection is mixed with the air-fuel mixture newly introduced for the main injection to form a CAI self ignitable homogenous fresh air exhaust gas mixture. This is identified in FIG. 2 by the step MI. the change into the CAI_operating mode MCAI through the control command "Activate CAI_Mode" follows thereafter.

In order to make possible the return into the CAI operating mode which prevailed before the pull fuel cut off phase after a pull fuel cut off phase without detour via the externally ignited SI operating mode, a certain advance fuel injection quantity is injected in the combustion chamber of the specific cylinder which happens to be at the end of the pull fuel cut off phase in the exhaust stroke of its combustion cycle immediately after the closing end of its exhaust valve in the interim compression phase in the exhaust stroke to the fresh air quantity present in the combustion chamber so that an externally ignitable air-fuel mixture is created which in the subsequent interim compression phase, i.e. in the actual charge change dead center can be externally ignited with an ignition device, more preferably spark plug and combusted. In the following intake stroke of this cylinder, fresh air flows into the combustion chamber via the gas inlet valve of said cylinder, thoroughly mixes with the hot exhaust gas from the inserted external ignition in the interim compression phase and through introducing a main fuel quantity finally forms a CAI capable homogenous air-fuel mixture which immediately in the following main compression phase is caused to self-ignite. Thus the direct re-entry in the CAI operating mode takes place after the pull fuel cut off. In a practical manner the introduction of the advance fuel injection quantity as auxiliary injection and the main fuel injection quantity as main injection are matched to one another in terms of timing and quantity in such a manner, that rotational moment jumps are largely avoided, i.e. that a largely steady rotational moment course is brought about. Because of this, a largely soft, substantially non-jerking return to or resumption of the fired CAI operation can be brought about after a thrust cut off. The direct resumption of the CAI operation after a pull fuel cut off can obviously be realized only when the engine operating point which results after the resumption can be realized in the CAI mode in terms of load and rotational speed. If the rotational speed through the pull fuel cut off drops so far that for instance idling operation is to be expected or CAI operation is no longer possible, changeover to the externally ignited SI-operating mode is practically effected.

More practically advantageous with this strategy for the direct resumption of the CAI operating mode following a pull fuel cut off is that after the pull fuel cut off the CAI operation can be directly resumed and no detour via the externally ignited SI-operation with corresponding valve lift changeover is necessary. Such a valve lift changeover would namely be expensive in terms of technical control, would pose the risk of changeover errors which would result in jerking and diminish the CAI potential. Since the load control of the CAI operating mode primarily takes place via fuel quantity and injection phasing, no throttling via the throttle valve is required. It can therefore remain opened during the pull fuel cut off in an advantageous manner, which has a positive effect on the behavior on the road during the pull fuel cut off phase since the engine breaking moment is very low and the vehicle without fuel requirement can coast for a correspondingly long time with only a small drop in rotational speed.

In addition to this, this resumption strategy of the CAI operating mode after a pull fuel cut off can also be transferred to other internal combustion engines if applicable which have an engine operation that is similar to a CAI operation.

What is claimed is:

1. A method for direct re-entry in a Controlled Auto Ignition (CAI) operating mode of an internal combustion engine following a pull fuel cut off phase in which a CAI specific valve lift for gas exhaust valves of the cylinders of the internal combustion engine during the pull fuel cut off phase of said engine is maintained, the method comprising the steps of:
upon a request signal for re-entry in the CAI operating mode after a closing time of one or several gas exhaust valves of a particular cylinder which happens to be at the end of the respective pull fuel cut off phase in an exhaust stroke of its combustion cycle, injecting in a combustion chamber of the particular cylinder an advance fuel injection quantity as auxiliary fuel injection to create an ignitable air-fuel mixture,
externally igniting through an ignition device the air-fuel mixture created in advance which is combusted in a following CAI interim compression phase of the exhaust stroke of that cylinder, as a result of which hot exhaust gas is formed in the combustion chamber of that cylinder,
in a following intake stroke of that cylinder, drawing fresh air into the combustion chamber of that cylinder via one or several gas inlet valves,
injecting in a following compression stroke of that cylinder a main fuel injection quantity in the combustion chamber of that cylinder in a main compression phase, and
mixing an exhaust gas content of that cylinder brought about from the earlier auxiliary fuel injection with the air-fuel mixture newly introduced for the main injection to form a CAI self ignitable homogenous fresh air-exhaust gas-fuel mixture such that the next sequential combustion following the externally ignited combustion of the advance fuel injection quantity is self-ignited without external ignition.

2. The method according to claim 1, wherein the advance fuel injection quantity for the auxiliary fuel injection in the interim compression phase of the respective cylinder, which happens to be at the end of the pull fuel cut off phase in the exhaust stroke of its combustion cycle, is apportioned into the combustion chamber of that cylinder in such a manner that upon re-entry in the CAI operating mode of the internal combustion engine after the main injection together with the main fuel injection quantity introduced in the process a substantially steady rotational moment course is brought about.

3. The method according to claim 1, wherein following the respective pull fuel cut off phase as CAI specific valve lift for at least one of the exhaust and inlet gas breathing valves of the cylinders a smaller valve lift than in a SI-operating mode of the internal combustion engine is selected.

4. The method according to claim 1, wherein even during the pull fuel cut off phase on at least one of an inlet and exhaust side a CAI specific smaller valve lift for the gas breathing valves than in a SI-operating mode of the internal combustion engine is maintained.

5. The method according to claim 1, wherein the changeover to an externally ignited SI-operating mode of the internal combustion engine is performed as soon as a rotational speed of the internal combustion engine falls below a predetermined threshold below which a CAI operating mode becomes impossible.

6. The method according to claim 1, wherein the auxiliary injection of an advance fuel injection quantity in the interim compression of the particular cylinder which happens to be at the end of the pull fuel cut off phase in the exhaust stroke of its combustion cycle is only initiated if a target engine operating point of the internal combustion engine after a resumption of the combustion operation permits the CAI operating mode.

7. The method according to claim 1, wherein during the pull fuel cut off phase a throttle valve in an air intake stroke of the internal combustion engine is opened as far as possible.

8. The method according to claim 1, wherein the request signal for re-entry in the CAI operating mode following a pull fuel cut off phase is created through a rotational moment request of a driver or through an engine control unit ECU of the internal combustion engine.

9. A control unit with a control process logic for the direct re-entry in the CAI operating mode of an internal combustion engine following a pull fuel cut off phase, wherein the control unit is operable to control
upon a request signal for re-entry in the CAI operating mode after a closing time of one or several gas exhaust valves of a particular cylinder which happens to be at the end of the respective pull fuel cut off phase in an exhaust stroke of its combustion cycle, an injection in a combustion chamber of the particular cylinder of an advance fuel injection quantity as auxiliary fuel injection to create an ignitable air-fuel mixture,
an external ignition through an ignition device of the air-fuel mixture created in advance which is combusted in a following CAI interim compression phase of the exhaust stroke of that cylinder, as a result of which hot exhaust gas is formed in the combustion chamber of that cylinder, in a following intake stroke of that cylinder, a drawing of fresh air into the combustion chamber of that cylinder via one or several gas inlet valves, injection in a following compression stroke of that cylinder of a main fuel injection quantity in the combustion chamber of that cylinder in a main compression phase, and mixing of an exhaust gas content of that cylinder brought about from the earlier auxiliary fuel injection with the air-fuel mixture newly introduced for the main injection to form a CAI self ignitable homogenous fresh air-exhaust gas-fuel mixture such that the next sequential combustion following the externally ignited combustion of the advance fuel injection quantity is self-ignited without external ignition.

10. The control unit according to claim 9, wherein the control unit is further operable to apportion the advance fuel injection quantity for the auxiliary fuel injection in the interim compression phase of the respective cylinder, which happens to be at the end of the pull fuel cut off phase in the exhaust stroke of its combustion cycle, into the combustion chamber of that cylinder in such a manner that upon re-entry in the CAI operating mode of the internal combustion engine after the main injection together with the main fuel injection quantity introduced in the process a substantially steady rotational moment course is brought about.

11. The control unit according to claim 9, wherein the control unit is further operable to select, following the respective pull fuel cut off phase as CAI specific valve lift for at least one of the exhaust and inlet gas breathing valves of the cylinders, a smaller valve lift than in a SI-operating mode of the internal combustion engine.

12. The control unit according to claim 9, wherein the control unit is further operable to maintain, even during the pull fuel cut off phase on at least one of an inlet and exhaust side, a CAI specific smaller valve lift for the gas breathing valves than in a SI-operating mode of the internal combustion engine.

13. The control unit according to claim 9, wherein the control unit is further operable to perform the changeover to an externally ignited SI-operating mode of the internal combustion engine as soon as a rotational speed of the internal combustion engine falls below a predetermined threshold below which a CAI operating mode becomes impossible.

14. The control unit according to claim 9, wherein the control unit is further operable to initiate the auxiliary injection of an advance fuel injection quantity in the interim compression of the particular cylinder which happens to be at the end of the pull fuel cut off phase in the exhaust stroke of its combustion cycle only if a target engine operating point of the internal combustion engine after a resumption of the combustion operation permits the CAI operating mode.

15. The control unit according to claim 9, wherein the control unit is further operable to open during the pull fuel cut off phase a throttle valve in an air intake stroke of the internal combustion engine as far as possible.

16. The control unit according to claim 9, wherein the request signal for re-entry in the CAI operating mode following a pull fuel cut off phase is created through a rotational moment request of a driver or through an engine control unit ECU of the internal combustion engine.

\* \* \* \* \*